United States Patent
Thoelke et al.

(10) Patent No.: US 8,135,938 B2
(45) Date of Patent: Mar. 13, 2012

(54) REAL TIME PAGED COMPUTING DEVICE AND METHOD OF OPERATION

(75) Inventors: Andrew Thoelke, Hitchin (GB); Dennis May, London (GB)

(73) Assignee: Nokia Corporation, Espoo (FI)

( * ) Notice: Subject to any disclaimer, the term of this patent is extended or adjusted under 35 U.S.C. 154(b) by 886 days.

(21) Appl. No.: 11/817,386

(22) PCT Filed: Mar. 1, 2006

(86) PCT No.: PCT/GB2006/000718
§ 371 (c)(1),
(2), (4) Date: Aug. 7, 2008

(87) PCT Pub. No.: WO2006/092587
PCT Pub. Date: Sep. 8, 2006

(65) Prior Publication Data
US 2009/0024825 A1    Jan. 22, 2009

(30) Foreign Application Priority Data
Mar. 2, 2005  (GB) .................................. 0504325.2

(51) Int. Cl.
*G06F 12/10* (2006.01)
(52) U.S. Cl. ................. 711/206; 711/202; 711/E12.061
(58) Field of Classification Search .................. 711/151, 711/202, 206, E12.061
See application file for complete search history.

(56) References Cited

U.S. PATENT DOCUMENTS

| 5,913,224 A | 6/1999 | MacDonald |
| 6,044,430 A | 3/2000 | MacDonald |
| 2001/0037495 A1 | 11/2001 | Kato et al. |

FOREIGN PATENT DOCUMENTS

| JP | 11-134204 | 5/1999 |
| WO | WO 2006/092587 A1 | 9/2006 |

OTHER PUBLICATIONS

International Search Report and Written Opinion for International Application No. PCT/GB2006/000718, mailed Jun. 21, 2006.
"Demand Paging" [online], Apr. 13, 2005 [retrieved Jul. 29, 2010]. Retrieved from the Internet: <http://www.msdn.microsoft.com/en-us/library/ms920206(printer).aspx>. 1 page.
"mlock(2): lock/unlock memory—Linux man page" [online] [retrieved Jul. 29, 2010]. Retrieved from the Internet: <http://linux.die.net/man/2/mlock>. 4 pages.
Steinmetz, R., "Analyzing the Multimedia Operating System," IEEE Multimedia, IEEE Service Center, NY, NY, vol. 2, No. 1, pp. 68-84 (Mar. 21, 1995)—XP000500087.

(Continued)

*Primary Examiner* — Yong Choe
(74) *Attorney, Agent, or Firm* — Alston & Bird LLP

(57) ABSTRACT

A component of a computing device, such as the kernel of an operating system, is arranged to identify real time processes running on the device and transparently lock the memory owned by such processes to avoid them being paged out. The kernel is also able to inspect all inter-process communications originated by the real time threads running in such processes, in order to ascertain what other processes they invoke, and, if they have the potential to block a real time operation, the kernel is arranged to lock the areas of memory these processes reference. This procedure operates recursively, and ensures that page faults which might affect the operation of any real time process do not occur.

22 Claims, 5 Drawing Sheets

OTHER PUBLICATIONS

Edy Bertolissi et al., Java in Real-Time Applications, IEEE Transactions on Nuclear Science, Aug. 1998, 1965-1971, vol. 45, No. 4, The Institution of Electrical Engineers, Stevenage, GB.

Zilker et al., "High-speed data acquisition with the Solaris and Linux operating systems," Fusion Engineering and Design, Elsevier Science Publishers, Amsterdam, NL, vol. 48, No. 1-2, pp. 193-197 (Aug. 1, 2000)—XP004212192.

Wang et al., "Implementaion of memory management of real-time process in Unix," Mini-Micro Systems, pp. 46-51, vol. 14 (1993) (Abstract only in English).

Search Report, dated Apr. 21, 2005, issued in an earlier-filed corresponding GB Application No. GB0504325.2.

Search Report, dated Apr. 21, 2006, issued in a corresponding (updated) GB Application No. GB0604117.2.

Office Action for Japanese Application No. 2007-557581, dated Oct. 11, 2011.

REAL TIME PAGED COMPUTING DEVICE AND METHOD OF OPERATION

CROSS REFERENCE TO RELATED APPLICATIONS

This application claims the priority of PCT/GB2006/000718 filed on Mar. 1, 2006 and GB 0504325.2 filed on Mar. 2, 2005, the entire contents of which are hereby incorporated in total by reference.

FIELD OF THE INVENTION

The present invention relates to a computing device, and in particular to a method for operating a computing device which can achieve real time performance for client-server and other inter-process communications in the device.

The term computing device as used herein is to be expansively construed to cover any form of electrical computing device and includes, data recording devices, computers of any type or form, including hand held and personal computers such as Personal Digital Assistants (PDAs), and communication devices of any form factor, including mobile phones, smart phones, communicators which combine communications, image recording and/or playback, and computing functionality within a single device, and other forms of wireless and wired information devices, including digital cameras, MP3 and other music players, and digital radios.

There is a hierarchy of memory types in computing devices; in general, the faster the memory, the more expensive it is. Computer scientists and software engineers have developed a number of techniques for making efficient use of the various types of memory in these devices. One of the main examples of this art is known as paging.

One of the most common forms of paging is 'demand paging', which is described in more detail below, but other paging algorithms, such as prepaging, are also possible. It is to be understood that this invention can also be used with these other paging algorithms, as appropriate.

Modern computing devices are able to address or reference large amounts of virtual memory: far in excess of what they actually have physically installed in the form of fast RAM (random access memory). For easy management this memory is often divided into blocks of fixed size, commonly known as pages; for example, 4K (4096 bytes) and various multiples thereof are common page sizes. Only a certain number of these pages (the exact number depends on how much memory the manufacturer of the device has chosen to provide) can be accommodated in primary RAM, and the remainder of the pages used are stored in some type of slower and cheaper secondary memory, such as a hard disk drive (HDD).

The total of all the addressable memory locations in use are termed 'virtual memory' and the computing device contains a mapping of virtual memory pages to physical memory pages. These mappings are known as page tables and, typically, these page tables are maintained by a memory management unit (MMU) which is implemented in hardware.

With demand paging, if an attempt is made to reference an address in a page of memory that is not held in RAM the MMU causes a page fault to occur. In this instance, the device temporarily halts processing while the relevant memory block is 'paged in' to RAM. This process involves copying the required page from slower and cheaper memory, typically the HDD, into RAM and updating the page tables in the MMU appropriately.

When a computing device has been running for some time, there will be no free memory into which a page can be copied because all of the physical RAM available in the computing device will already be in use. When this occurs, before a required block of memory can be paged in, the section of RAM into which it will be copied needs to be freed by using a reverse process, widely known in this art as paging out. Paging out usually involves copying a page from RAM back to the hard disk, or to whatever type of slower and cheaper secondary memory may be available, and updating the page tables in the MMU.

The decision as to which block of memory should be paged out is often a complex one; some of the simpler algorithms are to page out the least recently used (LRU) or least frequently used (LFU) block or blocks of memory.

It follows that in cases where the page has not changed since it was paged in, the copy step need not be performed. Unchanged pages are referred to as 'clean' pages while altered pages are referred to as 'dirty' pages; it is normal for the MMU to keep track of whether pages are clean or dirty by means of a flag associated with each page of physical memory.

There is a further advantage of paging when applied to mobile computing devices, which operate on a relatively restricted capacity battery source. Memory paging often enables considerable prolongation of battery life. Keeping blocks of memory on most types of secondary storage such as flash memory or small hard disks does not consume power when idle, but maintaining blocks of memory in volatile dynamic RAM does consume power, because dynamic RAM needs to be continually refreshed if it is not to lose its stored contents.

It is clear from the above description that, in a relative sense, the process of paging memory into and out of dynamic memory can occupy some considerable time. Aside from the necessity to manipulate page tables and work out which block of primary RAM needs to be paged out, the key factor is that paging in always requires a substantial amount of memory to be read from relatively slow secondary storage. Very often, pages will also need to be written to slow secondary storage. As an example, this would be necessary if the memory that is being paged out is flagged as dirty.

This timing burden on overall computing device operation is absolutely inevitable; if there was no speed difference between primary and secondary storage, there would be no hierarchy of memory within the device and paging would not be required.

The principal concern with the amount of time taken for paging is that this procedure can interfere with real time operations in the computing device; that is, operations that must be completed within a certain period of time to be completed correctly. Modern computing devices, especially those integrated into communications devices, such as smart phones, typically have to offer such real time guarantees for the devices to operate satisfactorily. For example, GSM mobile phones running signalling stacks need to track time slots which are only 577 microseconds in length. Thus, if a page fault occurs during an operation which seeks to make real time guarantees, these are liable to be broken if the operation becomes blocked until the memory required to be referenced is paged back in. The problem in practice is that there is no way of predicting when a page fault might occur, and when one does occur, how long the overall paging procedure will take to remedy the fault.

Because of this, it is now generally recognised that paging is not normally compatible with running a real time system in a computing device. This is because of the unpredictability of the occurrence of a page fault and because of the time it takes to read and write memory to and from relatively slow media storage after each page fault.

When a device depends on being able to offer real time guarantees, paging can either crash the device or render it useless; the aforementioned mobile phone stacks are an example of this, where failure to adhere to the constraints of the communication stacks can, in the worst case, cause calls to be dropped completely by the device. Where the real time guarantees are needed for perceived acceptable performance, paging can render applications unusable; attempts to handle streaming audio or video on a non-real time or 'slow' system demonstrate this perfectly.

Some operating systems which implement demand paging specifically state that it should not be used in a real time system. For example, Microsoft state in the Windows CE .Net documentation (http://msdn.microsoft.com/library/default.asp?url=/library/en-us/wcemain4/html/cmcondemandpaging.asp) that "because there is a penalty for using demand paging in a real time environment, it should be avoided."

Other operating systems attempt to ameliorate the problem. Documentation for the Linux mlock system call (http://linux.ctyme.com/man/man1739.htm) states that "Real time applications require deterministic timing . . . paging is one major cause of unexpected program execution delays."

The mlock Linux system call attempts to provide one solution for this problem in that it disables paging for a specific range of memory addresses. However, those skilled in the art of computer programming will readily recognise that a system which requires applications to know the memory addresses at which they load, together with the memory addresses of all the memory they reference (either directly or indirectly), the addresses of any system calls that they might need to use, together with the memory those calls reference, cannot be regarded as a practical solution for application development.

SUMMARY OF THE INVENTION

Therefore, it is an object of the present invention to provide an improved method for enabling real time performance with memory paging in a computing device.

According to a first aspect of the present invention there is provided a method of providing real time performance with memory paging in a computing device, the method comprising enabling a component to a. identify processes including a thread of execution requiring real time performance;
b. identify processes including a thread of execution requiring real time performance and invoked by a thread of execution which has been identified previously as requiring real time performance;
c. identify processes which own memory referenced by a thread of execution identified as requiring real time performance;
d. lock the memory belonging to all processes so identified for preventing the said memory from being paged out;
e. identify any process whose threads of execution no longer require real time performance; and
f. unlock memory no longer referenced by a thread of execution requiring real time performance.

According to a second aspect of the present invention there is provided a computing device comprising a component that is enabled to a. identify processes including a thread of execution requiring real time performance;
b. identify processes including a thread of execution requiring real time performance and invoked by a thread of execution which has been identified previously as requiring real time performance;
c. identify processes which own memory referenced by a thread of execution identified as requiring real time performance;
d. lock the memory belonging to all processes so identified for preventing the said memory from being paged out;
e. identify any process whose threads of execution no longer require real time performance; and
f. unlock memory no longer referenced by a thread of execution requiring real time performance, thereby to provide real time performance with memory paging in the computing device.

According to a third aspect of the present invention there is provided an operating system for causing a computing device according to the second aspect to operate in accordance with a method of the first aspect.

An embodiment of the present invention will now be described, by way of further example only, with reference to the accompanying drawings in which:

DETAILED DESCRIPTION OF THE INVENTION

Figure 1:
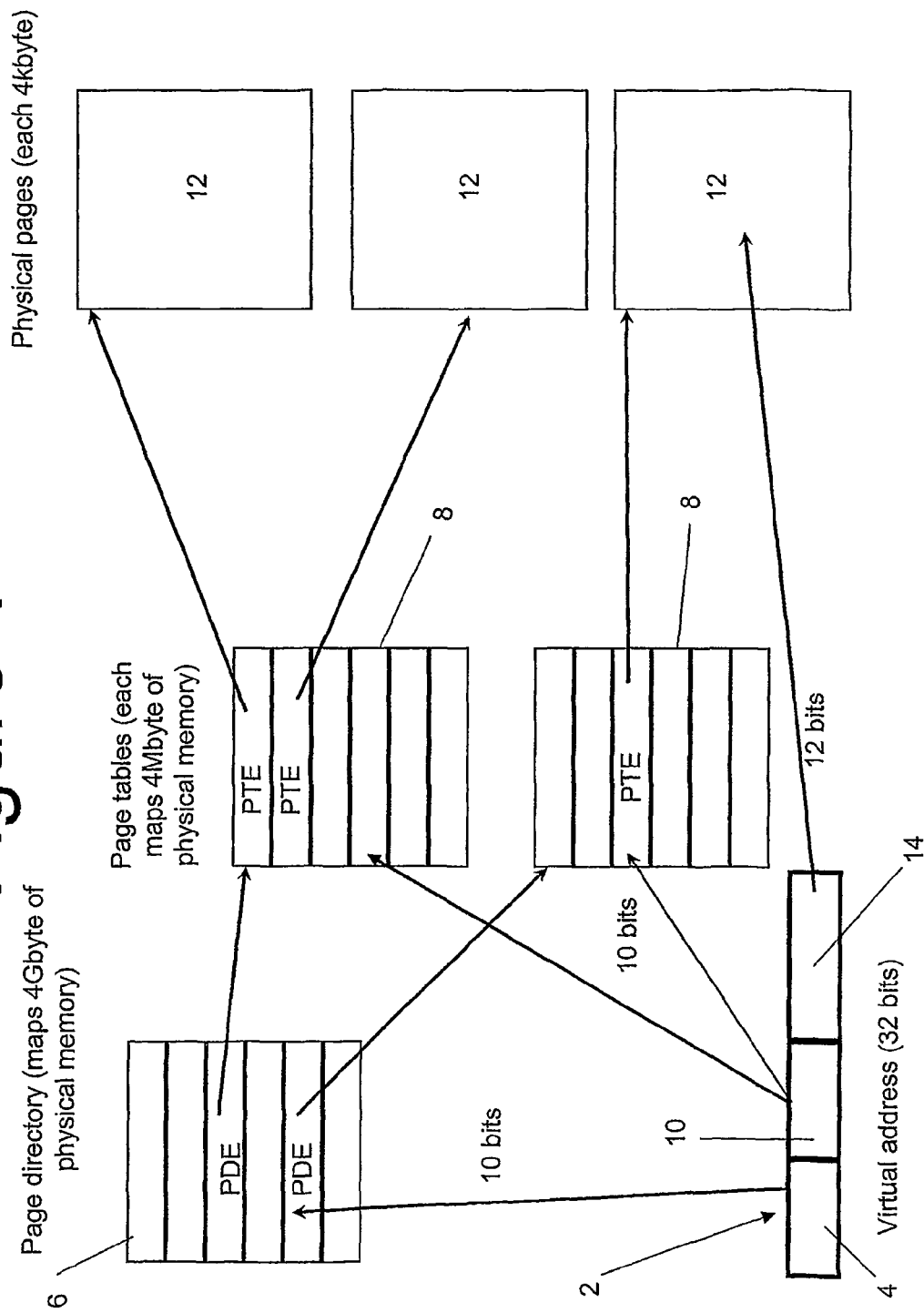
FIG. 1 illustrates schematically a method for demand paging in a computing device.

FIG. 1 illustrates schematically how demand paging may be carried out.

It is very common for the MMU of a computing device to convert virtual memory addresses to physical memory addresses by means of one or more Translation Lookaside Buffers (TLBs).

FIG. 1 shows an example of how this works in the case of a two level page table implementation based on 4K pages, as implemented in Intel™ x86 and many ARM™ processors. On these processors, the MMU converts a 'virtual' 32 bit address 2, which can map four gigabytes of 'virtual' address space within memory, to a 'physical' 32 bit address by a series of table look-ups.

The most significant ten bits 4 of the virtual address 2 index into a 4k table 6, known as the Page Directory, which comprises of 1024 32 bit values. Each of the 32 bit values of the Page Directory table 6 is known as a Page Directory Entry (PDE). The PDE indexed by the most significant ten bits of the virtual address 2 is a (virtual) pointer to another 4k table 8 of 32 bit entries, known as a Page Table. The 32 bit entries of the Page Table are known as Page Table Entries (PTEs). Each page table can map four megabytes of physical memory. Thus, if the whole of the 4 gigabyte virtual address space was backed with physical memory, there would be one Page Table for each PDE: namely 1024 Page Tables. However, the Page Directory only needs to contain sufficient entries to map the actual physical memory addresses available on the device. Hence, in a device having, for example, 16 Mb of physical memory, four page tables would be required.

The next most significant ten bits 10 of the virtual address 2 index directly into the Page Table 8 mapped by the PDE indexed by the ten most significant bits 4 of the virtual address 2, giving a 32 bit value which is the start address of a 4K physical page 12.

The remaining, or least significant, twelve bits 14 of the virtual address 2 pass straight through the above translation mechanism to select a byte within the 4k physical page 12 addressed by the 32 bit value (PTE) from the respective page table 8. Hence, it can be seen that by using a Page Directory and Page Tables as shown in FIG. 1, the 32 bit virtual address can be used to select any byte within the memory pages of the physical memory of the computing device.

The present invention is based on the perception that the problems described above in relation to the known art are not mostly caused by the fact that portions of a running process are liable to become paged out. In fact, marking the pages used by any single process containing a real time thread as being subject to real time constraints and which should therefore not be paged out is not particularly difficult for those skilled in the art to implement. Such marking can, for example, be performed automatically at process creation time by the operating system kernel (which is that privileged part of the operating system responsible for creating threads and processes and enforcing process boundaries), provided a facility such as the mlock call referred to above is available. Other necessary steps, such as ensuring that real time threads are coded in such a way that they will fit into physical memory and therefore will not need to be paged out are similarly not overly complex design solutions for a person skilled in this art.

Additionally, the present invention is predicated on the perception that what actually causes most problems for real time processes in a computing device implementing paging is that, like all processes running on modern computing devices, they rely on operating system services which, essentially, are available to all processes, whether real time or not. It is these common services which are likely to become blocked by demand paging, thereby affecting the real time capabilities of the processes relying on them. In cases where access to these common services is mediated by the operating system kernel but not actually provided by the kernel, operational problems are particularly likely to be manifest, because there is no easy solution for ensuring that memory pages referenced outside the kernel will not be paged out.

Client-server interactions are a very good example of this problem. Because client processes and server processes live in different address spaces, they need to communicate via inter process communication (IPC) mechanisms which must always be mediated by the kernel; as explained above, the kernel is that privileged part of the operating system which enforces process boundaries and therefore has to mediate over all IPC in the device.

Any single server can provide services for any clients irrespective of whether they are real time or not; if a server is not providing services for any real time clients, there is no reason why the memory that server references should not be paged out. On the other hand, if a server is providing services for a real time client, then there is certainly a requirement that the memory referenced by the IPC relating to that client should not be paged out under any circumstances, since this would give rise to the possibility of the server becoming blocked by a page fault, which would clearly affect the real time performance of such a client.

Furthermore, if the design of a server is such that any page fault, including those relating the memory to non-real time clients, would cause it to become blocked for all other clients, then it is clear that none of the memory referenced by any client of such a server should ever be paged out if real time performance is to be maintained.

One instance of such a problematic relationship would be that between a communications server and its clients. If the communications server is blocked by a page fault and is waiting for client memory to be paged back in, then it cannot service any clients in the period taken for sufficient memory to be paged back in, even if one of its clients is a real time one. Therefore, it follows that the memory referenced by any server with a real time client must not be paged out; but where there are no real time clients, then paging out server memory buffers is not problematic.

The problem presented above is addressed by the present invention by modifying the way in which client-server communications (and, by extension, other IPC mechanisms) function in the computing device. A key aspect of the present invention is that once it becomes possible for the kernel to know exactly what areas of memory are referenced by a client/server message, it becomes technically feasible for the kernel to inspect the message and lock the relevant memory pages. This locking procedure prevents the relevant memory pages from being paged out until the message has completed. This ensures that the server can provide a guarantee not to fault when reading or writing client memory.

Because this operation takes place within the kernel, it is transparent to both the server and its clients; so, unlike the mlock procedure referred to above, there is no need for non-kernel processes to know anything about the addresses of the memory that they own or reference.

An example of an operating system kernel with such a capability is the EKA2 kernel of the Symbian OS™ operating system from Symbian Software Ltd. This kernel has real time capabilities, but additionally has the ability to inspect IPC messages (including client-server messages) and see what memory the messages reference. Such messages are passed through the kernel by means of the RMessage2 class, which can be defined as follows:

```
public:
    enum TSessionMessages {EConnect=-1,EDisConnect=-2};
public:
    inline RMessage2( );
    inline TInt Function( ) const;
    inline TInt Int0( ) const;
    inline TInt Int1( ) const;
    inline TInt Int2( ) const;
    inline TInt Int3( ) const;
    inline const TAny* Ptr0( ) const;
    inline const TAny* Ptr1( ) const;
    inline const TAny* Ptr2( ) const;
    inline const TAny* Ptr3( ) const;
    inline CSession2* Session( ) const;
    IMPORT_C explicit RMessage2(const RMessagePtr2& aPtr);
    IMPORT_C TUint32 SecureId( ) const;
    IMPORT_C TUint32 VendorId( ) const;
    IMPORT_C TInt HasCapability(TCapability) const;
    IMPORT_C TInt HasCapability(TCapability, TCapability) const;
    IMPORT_C TInt HasCapability(TCapability, TCapability, TCapability) const;
    IMPORT_C TInt CheckPolicy(const TSecurityPolicy&) const;
protected:
```

```
    TInt iFunction;
    TInt iArgs[KMaxMessageArguments];
private:
    TInt iSpare1;           // Reserved for future use
protected:
    const TAny* iSessionPtr;
private:
    TInt iSpare2;           // Reserved for future use
    TInt iSpare3;           // Reserved for future use
    };
```

Those skilled in the art of programming for the Symbian OS™ operating system will see from the above code that every message includes four general purpose parameters, each of which can be a pointer to a descriptor in the client memory space. All descriptor types are supported, and a TPtrC type descriptor can refer to a memory buffer elsewhere in the client memory space.

Figure 2:
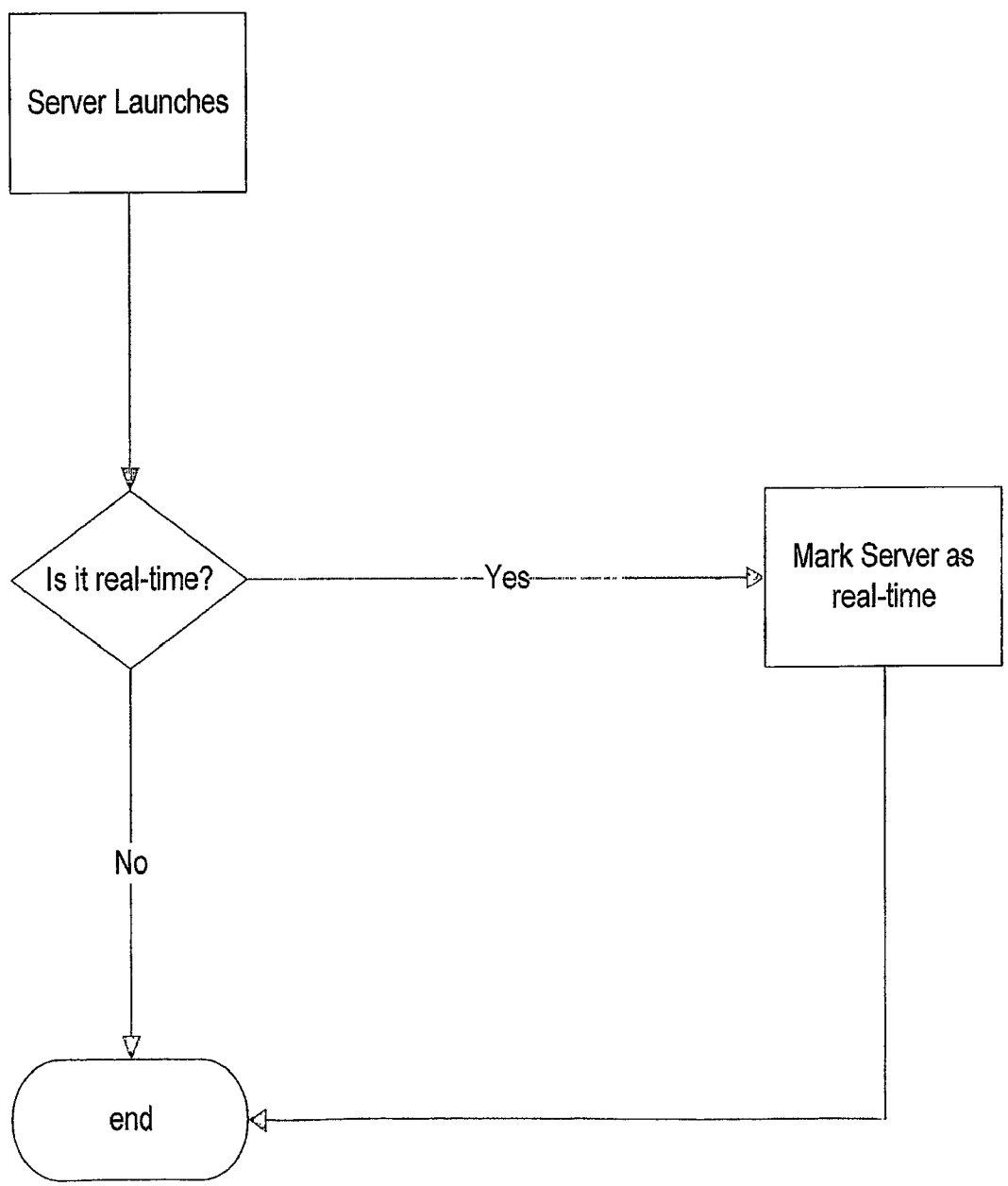
FIG. 2 shows a procedure for marking a server as a real time server at the time it is launched.
Figure 3:
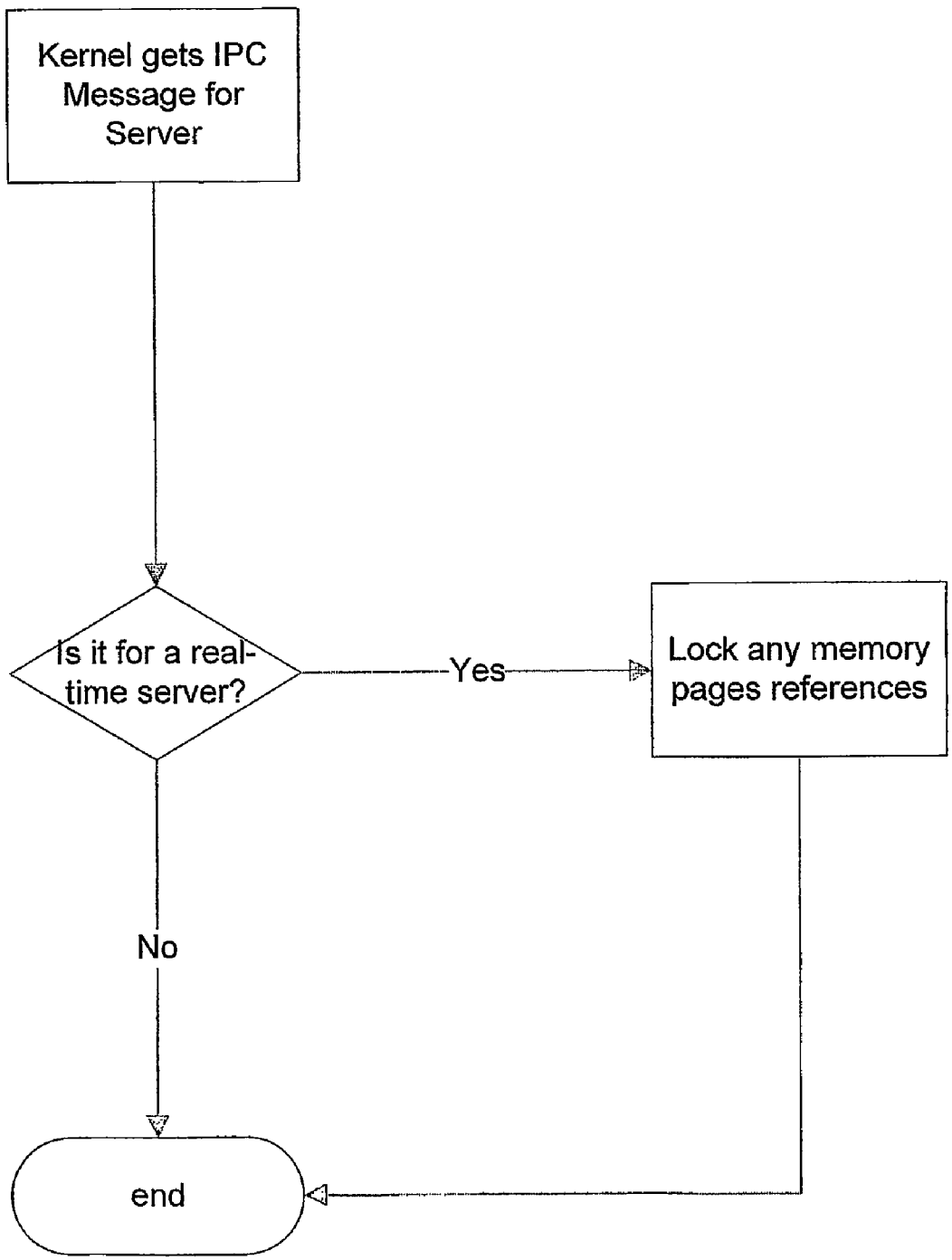
FIG. 3 shows a procedure for locking memory in accordance with an embodiment of the invention.

The most straightforward implementation of this invention is for an operating system service which might be needed by real-time clients to mark itself as a real-time server when it is first launched. This procedure can be seen in FIG. 2. In FIG. 3 it can be seen that the kernel inspects all IPC messages directed at such a server. If the message is for a real time server, the kernel locks the memory pages that server references, as shown in FIG. 3, thus guaranteeing that these clients will not encounter any page faults. In the Symbian OS™ operating system implementation described above, this can be achieved by arranging for the operating system kernel to inspect, for all applicable Rmessage2 objects, the contents of the headers of the four possible descriptors in client memory.

However, more complex embodiments of this invention are also envisaged which are able to operate more efficiently by utilising the real time status of the client as well as that of the server. In this way, these implementations are able to minimise the number of memory pages that require locking. Examples of these more complex implementations in terms of client-server interactions will now be described.

Figure 4:
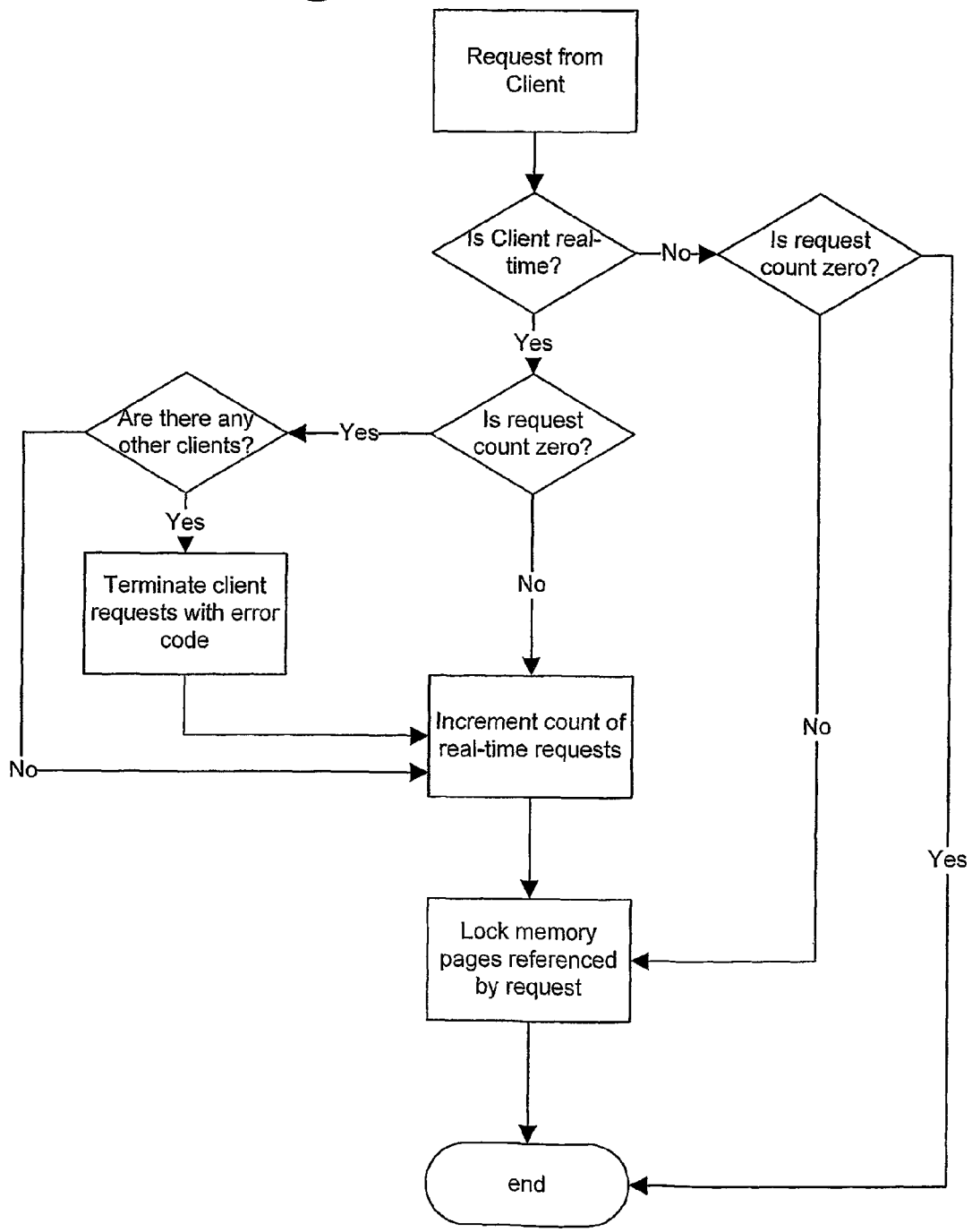
FIG. 4 shows a procedure for incrementing a count of real time requests on a service in accordance with a referred embodiment of the invention.

The kernel in any operating system capable of real time performance will be aware of the priority of all threads of execution running in the system, because the kernel needs this information to schedule tasks appropriately in order to meet real time guarantees. The kernel will, therefore, know whether the client passing a message has real time priority, as shown in FIG. 4, and is consequently able to monitor which servers have outstanding requests from real time clients and therefore need to have sufficient resources available to avoid the generation of page faults.

If a server is designed such that a page fault relating to one client request does not block other client requests, it is sufficient for the kernel to lock only the memory referenced by requests from real time clients.

However, if a server is designed in such a way that a page fault could block the entire server, the kernel then needs to keep a count of the number of outstanding requests on the server. Therefore, as shown in FIG. 4, when the kernel receives a request from a client, it decides whether that client is a real time client. If the answer is 'No', it then determines whether the request count is zero. If the request count is not zero the memory referenced by the request is locked because it is known that there are outstanding requests from other real time clients.

Where a server has outstanding requests only from non-real time clients and that server receives a request from a real time client, the memory referenced by requests from the non-real time clients may have already been paged out, and hence cannot be paged back in (which is necessary for the request to run) without impacting the performance of the real time client. It is therefore preferable that all such requests, including any which may be outstanding at the time of the request from the real time client, be terminated with a failure code which enables the non-real time clients to identify the reason for the failure of a request as being one that only requires any such client to resubmit its original request.

Hence, if the client is real time, the kernel again determines whether or not the request count is zero. If at this stage it is determined that the count is not zero, meaning that there are other outstanding real time requests, the memory is locked, as shown in FIG. 4. If the request count is zero, the kernel then determines whether or not there are any other clients. If the answer is 'yes' the requests are terminated with an error code as described above because it is known that this other client is a non real time client since the request count has just been determined to be zero. The memory referenced by the request is then locked.

If it is determined that there are no other clients at this stage of the process the memory referenced by the request is locked. Once the memory is locked, the kernel increments the count of the real time requests, as shown in FIG. 4.

Figure 5:
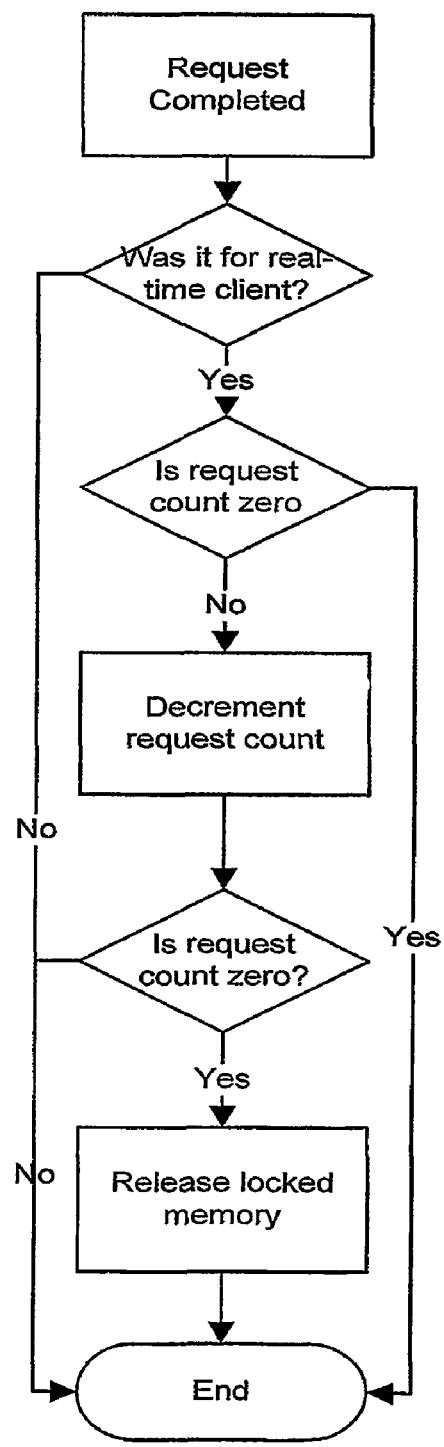
FIG. 5 shows a procedure for decrementing the count of real time requests to enable the release of locked memory.

FIG. 5 shows the procedure when a request completes. When a request completes, it is first determined whether the request count is zero. If 'No', the count is then decremented, as shown in FIG. 5, and once the count reaches zero, all the locked pages referenced by that server can be unlocked. For this embodiment of the invention, it is also envisaged that under certain circumstances it may be preferable to count server sessions opened by real time clients rather than individual client requests as this obviates the need to lock and unlock pages on each transition of the count to or from zero.

In this scenario the kernel also requires to allocate sufficient memory to remember which pages were locked so that exactly those pages are unlocked after message completion.

It will be appreciated that this invention is capable of application to any computing device incorporating any type of memory paging, irrespective of how the device decides which memory should be paged, and when. For the avoidance of doubt, the present invention is not restricted to demand paging. Those skilled in the art will observe that this invention is concerned with stopping specific pages from being paged out and not with deciding which pages should be paged in.

It will also be appreciated that while the present invention has been described with respect to an implementation in the Symbian OS™ operating system kernel, any device component or combination of components with a privilege level sufficient to gather knowledge about thread priorities and process memory maps can perform the functionality provided. Hence, software components such as microkernels or servers, or sufficiently advanced hardware components such as MMUs, could also perform all or part of this functionality. In essence, therefore, the component providing the desired functionality may comprise a number of sub-components, which in turn may be further combined with another component. So, for example, it is envisaged the required functionality could be provided by a plurality of microkernels in combination with an MMU.

It can be seen therefore that a key advantage of this invention is that it enables a computing device to make use of paging to efficiently manage a hierarchy of memory types with different performance and cost characteristics without impacting the ability of that device to run real time software which makes hard timing guarantees.

Although the present invention has been described with reference to particular embodiments, it will be appreciated that modifications may be effected whilst remaining within the scope of the present invention as defined by the appended claims.

The invention claimed is:

1. A method of providing real time performance with memory paging in a computing device, the method comprising enabling a component to
   a. identify processes including a thread of execution requiring real time performance;
   b. identify processes including the thread of execution requiring real time performance and invoked by a thread of execution which has been identified previously as requiring real time performance;
   c. identify processes which own memory referenced by a thread of execution identified as requiring real time performance;
   d. lock the memory belonging to all processes so identified for preventing the said memory from being paged out;
   e. identify any process whose threads of execution no longer require real time performance; and
   f. unlock memory no longer referenced by a thread of execution requiring real time performance.

2. A method according to claim 1 wherein the component is selected to comprise an operating system kernel.

3. A method according to claim 1 wherein the component is selected to comprise a memory management unit.

4. A method according to claim 1 wherein the component is selected to comprise a plurality of sub-components.

5. A method according to claim 1 wherein the component is arranged to distinguish between memory which would and memory which would not block or impact the performance of a real time thread if paged out, and to lock only the former.

6. A method according to claim 1 wherein the component is arranged to monitor inter process communication (IPC) calls.

7. A method according to claim 1 wherein the component monitors client-server interactions.

8. A method according to claim 7 wherein the component is arranged to monitor headers of descriptors in client memory.

9. A method according to claim 7 wherein the component is arranged to count outstanding requests on the server.

10. A method according to claim 7 wherein the component is arranged to count server sessions opened by real time clients.

11. A method according to claim 7 wherein the component is arranged to terminate a request to page memory from a non real time client which is denied by the component with a failure code for facilitating resubmission of the request by the non real time client.

12. A computing device comprising a component that is enabled to
    a. identify processes including a thread of execution requiring real time performance;
    b. identify processes including the thread of execution requiring real time performance and invoked by a thread of execution which has been identified previously as requiring real time performance;
    c. identify processes which own memory referenced by a thread of execution identified as requiring real time performance;
    d. lock the memory belonging to all processes so identified for preventing the said memory from being paged out;
    e. identify any process whose threads of execution no longer require real time performance; and
    f. unlock memory no longer referenced by a thread of execution requiring real time performance,
    thereby to provide real time performance with memory paging in the computing device.

13. A device according to claim 12 wherein the component comprises an operating system kernel.

14. A device according to claim 12 wherein the component comprises a memory management unit.

15. A device according to claim 12 wherein the component comprises a plurality of sub-components.

16. A device according to claim 12 wherein the component is arranged to distinguish between memory which would and memory which would not block or impact the performance of a real time thread if paged out, and to lock only the former.

17. A device according to claim 12 wherein the component is arranged to monitor inter process communication (IPC) calls.

18. A device according to claim 12 wherein the component is arranged to monitor client-server interactions.

19. A device according to claim 18 wherein the component is arranged to monitor headers of descriptors in client memory.

20. A device according to claim 18 wherein the component is arranged to count outstanding requests on the server.

21. A device according to claim 18 wherein the component is arranged to count server sessions opened by real time clients.

22. A device according to claim 18 wherein the component is arranged to terminate a request to page memory from a non real time client which is denied by the component with a failure code for facilitating resubmission of the request by the non real time client.

* * * * *